(12) United States Patent
Hietbrink et al.

(10) Patent No.: US 10,792,714 B2
(45) Date of Patent: Oct. 6, 2020

(54) LIGHT EMITTING ARRANGEMENT AND METHOD FOR ANTI-FOULING OF A PROTECTED SURFACE

(71) Applicant: KONINKLIJKE PHILIPS N.V., Eindhoven (NL)

(72) Inventors: Roelant Boudewijn Hietbrink, Utrecht (NL); Bart Andre Salters, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 0 days.

(21) Appl. No.: 16/339,733

(22) PCT Filed: Oct. 10, 2017

(86) PCT No.: PCT/EP2017/075828
§ 371 (c)(1),
(2) Date: Apr. 5, 2019

(87) PCT Pub. No.: WO2018/069330
PCT Pub. Date: Apr. 19, 2018

(65) Prior Publication Data
US 2020/0047227 A1    Feb. 13, 2020

(30) Foreign Application Priority Data
Oct. 10, 2016   (EP) .................................... 16193044

(51) Int. Cl.
| F21V 1/00 | (2006.01) |
| B08B 17/02 | (2006.01) |
| B63B 59/04 | (2006.01) |
| F21V 8/00 | (2006.01) |

(52) U.S. Cl.
CPC .............. *B08B 17/02* (2013.01); *B63B 59/04* (2013.01); *G02B 6/0055* (2013.01); *G02B 6/0066* (2013.01); *G02B 6/0083* (2013.01)

(58) Field of Classification Search
None
See application file for complete search history.

(56) References Cited

U.S. PATENT DOCUMENTS

| 2009/0114928 A1 | 5/2009 | Messere et al. |
| 2009/0174300 A1 | 7/2009 | Jousse et al. |
| 2010/0283389 A1 | 11/2010 | Frederick et al. |
| 2014/0104821 A1 | 4/2014 | Visser |

FOREIGN PATENT DOCUMENTS

| GB | 2385026 A | 8/2003 |
| WO | 2014188347 A1 | 11/2014 |
| WO | 2016091735 A1 | 6/2016 |

*Primary Examiner* — Vip Patel

(57) ABSTRACT

A light emitting arrangement (100) is provided for realizing anti-fouling of a surface (30) of a marine structure. The light emitting arrangement is shaped in sheet form and has an optical medium (4) and a light source (20) embedded in the optical medium and configured to emit anti-fouling light from an emission surface (301). The light emitting arrangement has at least one mirror configured to reflect anti-fouling light from the light source towards the emission surface. The mirror is arranged near or at the back surface and is electrically conductive and coupled to the light source for constituting a first electrode (120) arranged for transfer of electrical power between the light source and a power source. For example, the mirror forms a capacitor (6) in combination with an external electrically conductive element (50) and a dielectric layer (4a).

20 Claims, 5 Drawing Sheets

LIGHT EMITTING ARRANGEMENT AND METHOD FOR ANTI-FOULING OF A PROTECTED SURFACE

CROSS-REFERENCE TO PRIOR APPLICATIONS

This application is the U.S. National Phase application under 35 U.S.C. § 371 of International Application No. PCT/EP2017/075828, filed on 10 Oct. 2017, which claims the benefit of European Patent Application No. 16193044.1, filed on 10 Oct. 2016. These applications are hereby incorporated by reference herein.

FIELD OF THE INVENTION

The invention relates to a light emitting arrangement configured to realize anti-fouling of a protected surface of a marine structure when immersed in a fouling liquid containing biofouling organisms. The light emitting arrangement is shaped in sheet form and comprises an optical medium and a light source embedded in the optical medium and configured to emit anti-fouling light. The optical medium allows at least part of the anti-fouling light to distribute through the optical medium. The optical medium has a back surface for facing the protected surface and an emission surface configured to emit the anti-fouling light in a direction away from the protected surface when the light emitting arrangement is arranged in or on the protected surface.

BACKGROUND OF THE INVENTION

Biofouling of surfaces which are exposed to water, during at least a part of their lifetime, is a well-known phenomenon, which causes substantial problems in many fields. For example, in the field of shipping, biofouling on the hull of ships is known to cause a severe increase in drag of the ships, and thus increased fuel consumption of the ships. In this respect, it is estimated that an increase of up to 40% in fuel consumption can be attributed to biofouling.

In general, biofouling is the accumulation of microorganisms, plants, algae, small animals and the like on surfaces. According to some estimates, over 1,800 species comprising over 4,000 organisms are responsible for biofouling. Hence, biofouling is caused by a wide variety of organisms, and involves much more than an attachment of barnacles and seaweeds to surfaces. Biofouling is divided into micro fouling which includes biofilm formation and bacterial adhesion, and macro fouling which includes the attachment of larger organisms. Due to the distinct chemistry and biology that determine what prevents them from settling, organisms are also classified as being hard or soft. Hard fouling organisms include calcareous organisms such as barnacles, encrusting bryozoans, mollusks, polychaetes and other tube worms, and zebra mussels. Soft fouling organisms include non-calcareous organisms such as seaweed, hydroids, algae and biofilm "slime". Together, these organisms form a fouling community.

As mentioned in the foregoing, biofouling creates substantial problems. Biofouling can cause machinery to stop working and water inlets to get clogged, to mention only two other negative consequences than the above-mentioned increase of drag of ships. Hence, the topic of anti-biofouling, i.e. the process of removing or preventing biofouling, is well-known.

WO 2014/188347 A1 discloses a method of anti-fouling of a surface while said surface is at least partially submersed in a liquid environment, in particular an aqueous or oily environment. The method involves providing an anti-fouling light and providing an optical medium in close proximity to the protected surface, the optical medium having a substantially planar emission surface. At least part of the light is distributed through the optical medium in a direction substantially parallel to the protected surface, and the anti-fouling light is emitted from the emission surface of the optical medium, in a direction away from the protected surface. The anti-fouling light may be ultraviolet light, and the optical medium may comprise ultraviolet transparent silicone, i.e. silicone that is substantially transparent to ultraviolet light, and/or ultraviolet grade fused silica, in particular quartz.

By applying the method known from WO 2014/188347 A1, it is possible to cover a protected surface to be kept clean from biofouling, at least to a significant extent, with a layer that emits germicidal light. The protected surface can be the hull of a ship, as mentioned earlier, but the method is equally applicable to other types of surface.

WO 2014/188347 A1 further discloses a lighting module that is suitable to be used for putting the above-mentioned method to practice. Thus, the lighting module comprises at least one light source for generating anti-fouling light and an optical medium for distributing the anti-fouling light from the light source. The at least one light source and/or the optical medium may be at least partially arranged in or on the protected surface so as to emit the anti-fouling light in a direction away from the protected surface. The lighting module may be provided as a foil that is suitable for application to the protected surface. In any case, it is possible for the lighting module to comprise a two-dimensional grid of light sources for generating anti-fouling light and for the optical medium to be arranged to distribute at least part of the anti-fouling light from the two-dimensional grid of light sources across the optical medium so as to provide a two-dimensional distribution of anti-fouling light exiting a light emission surface of the light module.

The two-dimensional grid of light sources may be arranged in a chicken-wire structure, a close-packed structure, a rows/columns structure, or any other suitable regular or irregular structure. One of the advantages of providing a two-dimensional grid of light sources is that homogeneity of light distribution across the emission surface is increased. The fact is that by having increased homogeneity of light distribution across the emission surface, under-illuminated areas may be reduced or even prevented, where biofouling may otherwise take place, while at the same time energy waste may be reduced or prevented as well, which may otherwise occur in over-illuminated areas receiving more light than needed for anti-fouling. WO 2014/188347 A1 also discloses that the light distribution across the emission surface may be further enhanced by having a pattern of scatters in appropriate places in the optical medium. In a general sense, it is indicated that ideas and solutions to obtain a better uniformity in a relatively thin optical structure involve an introduction of scatters and/or reflectors or other light spreaders directly in front of one or more light sources.

SUMMARY OF THE INVENTION

It follows from the foregoing that WO 2014/188347 A1 addresses the subject of improving homogeneity of light distribution across the emission surface of an anti-fouling lighting module. However, there is also a need to provide power to the light source in a convenient and reliable way.

The invention has as an object to provide distribution of anti-fouling light from a light source of a light emitting arrangement for anti-fouling of a protected surface, while also providing power to the light source.

According to the invention, a light emitting arrangement is provided that is configured to realize anti-fouling of a protected surface of a marine structure when immersed in a fouling liquid containing biofouling mechanisms, the light emitting arrangement being shaped in sheet form and comprising: an optical medium and a light source embedded in the optical medium and configured to emit anti-fouling light, the optical medium allowing at least part of the anti-fouling light to distribute through the optical medium, the optical medium having a back surface to be arranged in or on the protected surface and an emission surface configured to emit the anti-fouling light in a direction away from the protected surface, and the light emitting arrangement further comprising at least one mirror configured to reflect anti-fouling light from the light source towards the emission surface of the optical medium, wherein the mirror is arranged near or at the back surface and is electrically conductive and electrically coupled to the light source for providing a first electrode arranged for transferring electrical power between a power source and the light source.

The above features have the effect that when the invention is put to practice, an anti-fouling light emitting arrangement comprising an optical medium and a light source is provided. Advantageously the mirror is arranged to distribute the anti-fouling light, while at the same time a first electrode is formed to transfer electrical power from the power source to the light source. So the mirror also constitutes a conductor that conducts electrical current to an electrical terminal of the light source that is connected to the mirror.

Optionally, the mirror is arranged to provide the first electrode to form, in combination with an external electrically conductive element and a dielectric layer, a capacitor for capacitive transfer of electrical power between the first electrode and the external element. The capacitor is formed by the mirror in combination with the dielectric layer and an external electrically conductive element, which enables to transfer power to the light sources without the need of a galvanic connection. The marine structure below the protected surface may constitute said external electrically conductive element so that electrical power can be easily transferred when the light emitting arrangement is attached in or on the surface. The dielectric layer may be formed by the material of the optical medium when the mirror is embedded within the material near the back surface. Alternatively, or additionally, the dielectric layer may be formed by a coating layer present on the protected surface, e.g. a paint. A further electrical connection to the light source may, for example, be provided by a galvanic connection from the light emitting arrangement to the power source, and the liquid may, in use, be in contact with a conductor extending from the light emitting arrangement. Alternatively, a further part of the mirror may be arranged to form a further electrode arranged for providing a further connection to the power source, and/or to form a further capacitor in combination with a further external conductive element to transfer power from a high-frequency AC power source to the light source. The further electrical connection may, for example, be formed partly by said fouling liquid, e.g. seawater, and the liquid may, in use, constitute the further external conductive element to form said further capacitor.

The mirror may be arranged in the optical medium near the back surface thereof or at the back surface, and be positioned around the light source at the location where, in use, light is emanating from the light source. A further advantage then is protection of the protected surface from high intensity radiation close to the light source. It may be so that the light is blocked by the mirror from exiting the optical medium at the back surface thereof, for instance by means of a specular reflective layer or a scattering layer, respectively.

Optionally, the light emitting arrangement comprises a further mirror near or at the emission surface, a reflective side of the mirror facing the light source. The mirror may be arranged to locally decrease the emission of anti-fouling light at the emission surface of the optical medium in the direct vicinity of the light source, thereby contributing to the desired homogeneous distribution of the light across the emission surface. Optionally, such a further mirror is semi-transparent to the anti-fouling light. The mirror may also be a patterned mirror, for example. In view of the desired homogeneous distribution of the light across the emission surface, it is an option to have a design of the semi-transparent mirror in which the extent to which the mirror is patterned or semi-transparent to the anti-fouling light increases in a direction away from the light source, so as to allow more light to pass through at a larger distance from the light source.

Optionally, the further mirror is electrically conductive and electrically coupled to the light source for constituting a further electrode arranged to form, in combination with a further external electrically conductive element, a galvanic connection or a further capacitor for transfer of electrical power between the further electrode and the further external electrically conductive element. For example, the further external electrically conductive element may be formed by the fouling liquid, such as seawater. Also, the further mirror may be thermally coupled to the light source for constituting a heat sink.

In an embodiment of the light emitting arrangement, the mirror is thermally conductive and thermally coupled to the light source for constituting a heat sink for heat from the light source. Advantageously the mirror now combines the functions of distributing the anti-fouling light, transferring of power to the light source and providing a heat sink. Optionally, the mirror is thermally coupled to the light source via an electrically conductive material, the material also providing said electrical coupling to the light source. Effectively the electrically conductive material provides thermal and electrical conductance to the light source.

In an embodiment of the light emitting arrangement the mirror comprises at least a first part and a second part electrically isolated from the first part; wherein the first part of the mirror is electrically coupled to the light source for providing the first electrode and the second electrically part is electrically coupled to the light source for providing a further electrode. For example, where the light source is an LED, said first part may be coupled to the anode and the second part may be coupled to the cathode of the LED. Both parts of the mirror may be arranged along respective external conductive elements, so that electrical power from a high-frequency power source can be transferred to the LED wirelessly, i.e. without galvanic connections between the internal parts of the light emitting arrangement and the outside world.

In an embodiment of the light emitting arrangement at least a first part of the mirror is arranged for reflecting anti-fouling light in a specular manner from the light source towards the emission surface of the optical medium. Also, at least a second part of the mirror may be arranged and configured to predominantly make the anti-fouling light scatter out of the optical medium through the emission surface of the optical medium. By arrangement of the reflective and/or scattering parts of the mirror the anti-fouling light is distributed across the emission surface.

Optionally, the light emitting arrangement comprises a group of three zones covered by anti-fouling light from the light source, namely a first zone comprising the first part of the mirror which is arranged and configured to predominantly make the anti-fouling light reflect in a specular manner towards the emission surface of the optical medium, a second zone which is arranged and configured to predominantly realize propagation of the anti-fouling light through the optical medium by total internal reflection, and a third zone comprising the second part of the mirror which is arranged and configured to predominantly make the anti-fouling light scatter out of the optical medium through the emission surface of the optical medium, the first zone being closer to the light source than the second zone, and the second zone being closer to the light source than the third zone.

In the above arrangement, the three zones are associated with the light source in a particular order. A first zone, which is closest to the light source, is used for predominantly reflecting the anti-fouling light towards the emission surface of the optical medium in a specular manner, i.e. a mirror-like manner, through the optical medium. A second zone, which is further away from the light source than the first zone, is suitable for realizing propagation of the anti-fouling light through the optical medium by total internal reflection. A third zone, which is furthest away from the light source, is used for predominantly scattering the anti-fouling light, i.e. reflecting the anti-fouling light in a diffuse manner, out of the optical medium, through the emission surface of the optical medium. By having the zones as mentioned, excellent distribution of anti-fouling light across the emission surface of the optical medium is achieved. On the basis of its specular reflecting properties, the first zone is capable of redirecting part of the emitted anti-fouling light in the right direction, that is to say, in the direction of the second zone and the third zone. The second zone is an intermediate zone which allows for light to propagate in the direction of the third zone. In both the first zone and the second zone, part of the light is emitted from the emission surface of the optical medium, especially where the light hits the emission surface at an angle which enables the light to escape from the optical medium through the emission surface. On the basis of its light scattering properties, the third zone is capable of directing practically all of the light that reaches this zone out of the optical medium, through the emission surface.

The indication of a zone being arranged and configured to predominantly realize a certain effect on the anti-fouling light, i.e. specular reflection towards the emission surface of the optical medium in the first zone, propagation through the optical medium by total internal reflection in the second zone, and scattering out of the optical medium in the third zone, is to be understood so as to mean that the effect is applicable to a major part of the light in that zone. For example, scattering of the light does not only take place in the third zone, but may also take place in the first zone and the second zone, respectively, to some extent. However, in the first zone and the second zone, other effects are predominant, whereas the third zone can be distinguished from those other two zones on the basis of the fact that only in the third zone, the light scattering effect is predominant and is applicable to a significantly larger part of the light than in the other two zones. In a similar manner, it is true that a total internal reflection effect may also be present in the first zone and the third zone, respectively, to some small extent, but is clearly predominant, i.e. applicable to a major part of the light, in the second zone, and that specular reflection towards the emission surface of the optical medium may also take place in the second zone and the third zone, respectively, to some small extent, but is by far the effect that is most present in the first zone. Due to the zones increased power efficiency is achieved and a larger area of the protected surface may be kept clean and/or less power may be needed.

Furthermore, it is possible to have a light emitting arrangement that is transparent in a certain zone outside of the light source, for example at least in said second zone, which allows for visibility of the protected surface.

Additionally, the internal reflection of the light may be promoted by providing the back surface of the optical medium with a low-index layer in that zone. Note that it is possible for the back surface of the optical medium to be free from any layer or other means for reducing an index of refraction in that zone. If a low-index layer is applied, it is practical for the index of refraction of that layer to be lower than an index of refraction of the fouling liquid in which the protected surface is to be immersed. Otherwise, adding a layer does not help in promoting total internal reflection when compared to a situation in which only the refractive indices of the material of the optical medium and the fouling liquid are decisive factors.

In an embodiment of the light emitting arrangement, the light source is positioned closer to the emission surface of the optical medium than to the back surface of the optical medium, so as to have an increased area of the emission surface where the power density of the light is above a predetermined threshold that is known to be relevant when it comes to achieving anti-fouling effects. Furthermore, in order to enhance the effectiveness of the design of the light emitting arrangement according to the invention, the light source may be oriented so as to emit more than 50% of the anti-fouling light directly towards the back surface of the optical medium in the first zone. In this way, it can be achieved that in the first zone, a major part of the light is made to reflect in a specular manner and allowed to reach the second zone rather than to be emitted directly from the optical medium at the emission surface.

Optionally, the mirror comprises a first mirror part and a second mirror part, the first mirror part being electrically connected to a first electrical terminal of the light source and forming the first electrode and the second mirror part being electrically connected to a second electrical terminal of the light source and forming a second electrode to be connected to the power source. Advantageously both electrical terminals of the light source are connectable to respective terminals of the power source via the mirror parts.

In a practical embodiment of the light emitting arrangement according to the invention, the optical medium is in the form of a slab or sheet, wherein the emission surface of the optical medium and the back surface of the optical medium are substantially planar and extend substantially parallel to each other. In that embodiment, the optical medium is very well suitable to be applied as a cover to the protected surface.

It is practical for the light source to be adapted to emit ultraviolet light. A general advantage of using ultraviolet light for realizing anti-biofouling is that the microorganisms are prevented from adhering and rooting on the surface to be kept clean, without any harmful side effects or side effects which cannot be easily counteracted. The light source may be embedded in the optical medium, or may be arranged outside of the optical medium, at a position adjacent the optical medium.

For the sake of completeness, the following is noted in respect of anti-biofouling by using ultraviolet light. The light source of the anti-fouling light emitting arrangement may be chosen to specifically emit ultraviolet light of the c type, which is also known as UVC light, and even more specifically, light with a wavelength roughly between 220 nm and 300 nm. In practice the peak efficiency is achieved around 265 nm, with a fall-off towards higher and lower wavelengths. At 220 nm and at 300 nm, is has dropped to ~10% efficiency.

It has been found that most fouling organisms are killed, rendered inactive, or rendered unable to reproduce by exposing them to a certain dose of the ultraviolet light. A typical intensity that appears to be suitable for realizing anti-biofouling is 10 mW per square meter. The light may be applied continuously or at a suitable frequency, whatever is appropriate in a given situation, especially at a given light intensity. An LED is one type of UVC lamp that may be applied as the light source of the light emitting arrangement. It is a fact that LEDs can generally be included in relatively small packages and consume less power than other types of light sources. Also, LEDs can very well be embedded in a slab of material. Furthermore, LEDs can be manufactured to emit (ultraviolet) light of various desired wavelengths, and their operating parameters, most notably the output power, can be controlled to a high degree. The LED may be a so-called side-emitting LED, and may be arranged in the optical medium so as to emit the anti-fouling light in directions along the plane of the sheet.

When the light source is adapted to emit ultraviolet light, it is advantageous for the optical medium to comprise an ultraviolet transparent material such as ultraviolet transparent silicone. In a general sense, the fact that the optical medium comprises material that is configured to allow at least part of the anti-fouling light to distribute through the optical medium may be understood such as to imply that the optical medium comprises material that is substantially transparent to the anti-fouling light.

It is a practical possibility for the light emitting arrangement according to the invention to comprise a single optical medium and a plurality of light sources and a plurality of mirrors, wherein each of the mirrors is electrically coupled to one or more of the light sources. In such a case, the optical medium of the light emitting arrangement can be of any suitable shape and size, wherein light sources such as LEDs are distributed throughout the optical medium, and wherein the light emitted by each of the light sources is distributed across the emission surface of the optical medium to an optimized extent. The light sources can be arranged in a series of parallel connections in a grid via various parts of the mirror, optionally a grid having a structure of further conductive tracks extending from the mirrors. Respective light sources may be connected to the power source via respective mirrors, or the arrangement may connect multiple light sources in parallel, or in series, via one or more mirrors to the power source.

The invention is applicable in various contexts. For example, the light emitting arrangement according to the invention may be applied in the context of a marine vessel. So, optionally, a marine structure has an outer surface comprising the above light emitting arrangement, wherein the light emitting arrangement is attached to said outer surface for realizing anti-fouling of the outer surface when immersed in a fouling liquid containing biofouling organisms. Also, in a method for installing the above light emitting arrangement, the method comprises the step of attaching the light emitting arrangement to an outer surface of a marine structure for realizing anti-fouling of the outer surface when immersed in a fouling liquid containing biofouling organisms. Also, use of the above light emitting arrangement is foreseen, while the light emitting arrangement is installed to an outer surface of a marine structure for realizing anti-fouling of the outer surface when immersed in a fouling liquid containing biofouling organisms. In such contexts, the light emitting arrangement is arranged so as to have a function in keeping, for example, a vessel's hull clean from biofouling, which does not alter the fact that numerous other application possibilities exist in that context as well.

The above-described and other aspects of the invention will be apparent from and elucidated with reference to the following detailed description of embodiments of a light emitting arrangement comprising an optical medium and one or more light sources embedded in the optical medium, which light sources serve for emitting anti-fouling light, so that the light emitting arrangement is suitable to be used for realizing anti-fouling of a protected surface.

BRIEF DESCRIPTION OF THE DRAWINGS

These and other aspects of the invention will be apparent from and elucidated further with reference to the embodiments described by way of example in the following description and with reference to the accompanying drawings, in which.

The figures are purely diagrammatic and not drawn to scale. In the Figures, elements which correspond to elements already described may have the same reference numerals.

DETAILED DESCRIPTION OF EMBODIMENTS

Figure 1:
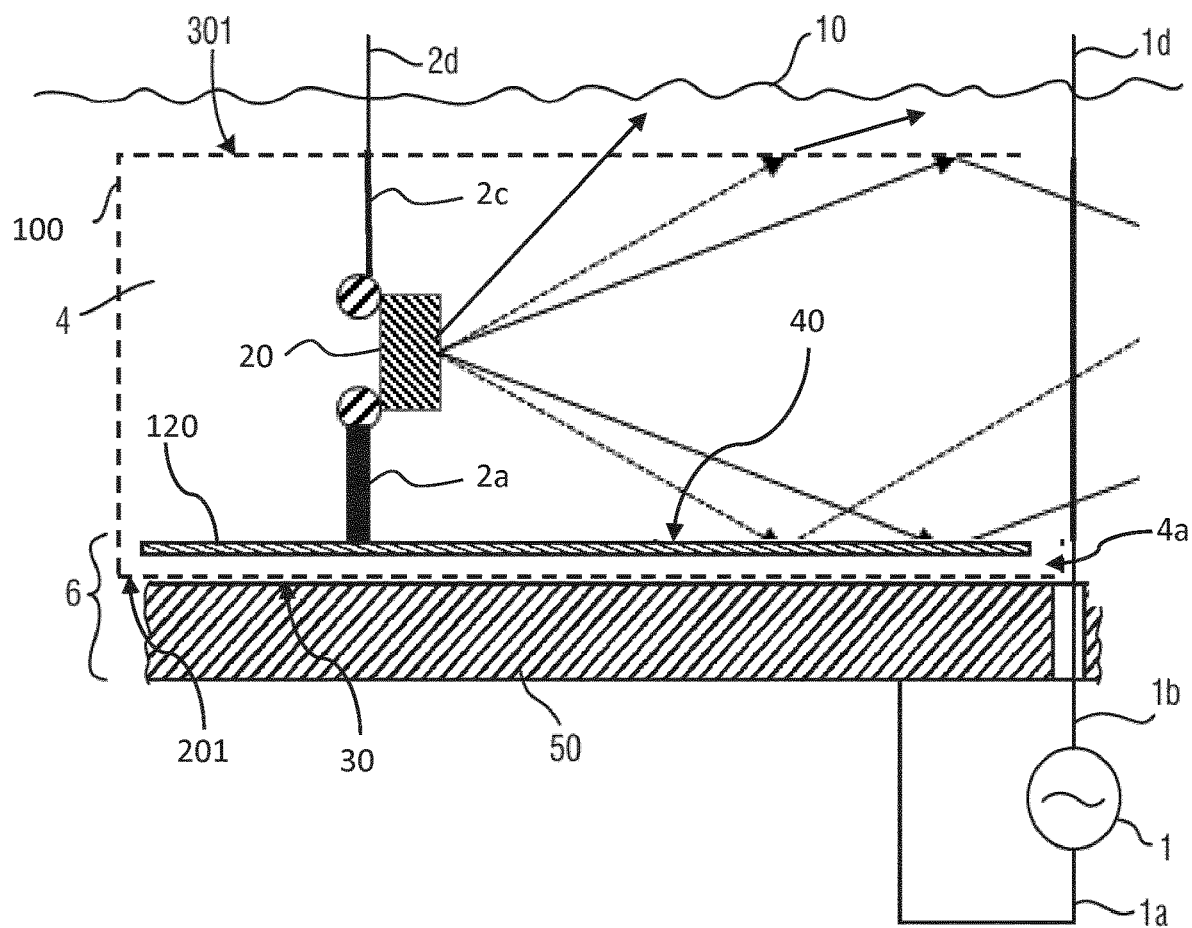
FIG. 1 shows a light emitting arrangement for realizing anti-fouling of a protected surface when immersed in a fouling liquid 10 containing biofouling organisms.

In the following, the present invention will be explained with reference to an application scenario, in which it is used for powering of UV light sources (in particular LEDs) that may be mounted to the outer surface of a ship hull to counter bio-fouling. Hence, before the details of various embodiments of disclosed subject matter will be explained, the general idea and known approaches to counter bio-fouling in such an application scenario will be discussed.

WO 2014/188347 A1 discloses a method of anti-fouling of a surface while said surface is at least partially submersed in a liquid environment. The disclosed method comprises providing an anti-fouling light, distributing at least part of the light through an optical medium comprising a silicone material and/or UV grade (fused) silica, and emitting the anti-fouling light from the optical medium and from the surface. Such anti-fouling solutions are based on UV-C irradiation to prevent the (initial) settlement of micro- and macro organisms, for instance on a ship hull. The problem with bio-films is that as their thickness increases over time due to growth of the organisms its surface roughens. Hence, the drag increases, requiring the engine to consume more fuel to maintain the ship's cruising speed, and thus the operational costs increase. Another impact of bio-fouling can be a reduction in the cooling capacity of a pipe radiator or a flow capacity reduction of salt water intake filters and pipes. Therefore, service and maintenance costs increase.

A potential solution to counter bio-fouling of the ship hull can be the coverage of the exterior hull with slabs of for example UV-C transparent materials having embedded UV-C LED(s). These slabs, or generally any light emitting arrangement (i.e. elements or arrangements consuming electrical energy for generating light), are located below the waterline. This is because the submerged surfaces are predominantly sensitive to bio-fouling and, hence, responsible for the increase in drag. Hence, electrical power needs to be delivered under the water-line towards the loads.

The combination of electricity, water and the rough and tough environment of the off-shore industry poses a real challenge. This is because (sea) water is a good electric conductor and, hence, short circuits may easily arise. Furthermore, water decomposes under the influence of an electrical current. In the case of sea water, it decomposes under DC current in chlorine and hydrogen gas. Under AC current, both gasses are formed alternatingly at each electrode. An additional problem with the gasses formed is that chlorine can enhance the already natural occurring corrosion of the steel ship hull and accelerates the degradation of other materials including the UV-C LEDs if not hermetically sealed. The hydrogen gas on the other hand can cause iron embrittlement, eventually leading to severe crack formation within the iron bulk.

To counter natural corrosion of the steel hull most ships are coated or painted and in addition often equipped with passive or active cathodic protecting systems such that the ship hull remains protected against natural corrosion when the protective coat or paint fails locally. Passive systems use sacrificial Zinc, Aluminum or Iron anodes that dissolve electro-chemically over time, whereas active systems impress a DC current in using anodes made of MMO-Ti (mix metal oxides) coated Titanium or Pt/Ti (Platinum coated Titanium). For active systems impressing a DC current into the sea water careful monitoring is required as too large currents may dissolve the hull locally at enhanced rates. Obviously, anti-fouling solutions should not render the cathodic protection system to fail. Hence, the ship's hull should act as the ground terminal, the protective currents should be DC, and the sea water may serve as a high conductivity medium closing the electric circuit.

Furthermore, ship hulls get (severely) damaged over life, for example due to natural wear, non-intentional collisions with float wood and other close or near to the surface floating objects, or they may suffer from more controlled impacts due to collisions with other ships, such as towboats or ships bound adjacent. It is therefore more than likely that also the anti-fouling loads get damaged over life as well as the power supply lines. Moreover, both loads and supply lines may get severely damaged and even get cut to yield open circuits wet by the conductive sea water. Hence, unwanted electro-chemistry may occur because of external inflicted damage. For this reason, DC power sources should not be used as the primary power source for powering the loads.

However, in principle, an UV-C LED is operated by DC currents. Hence, within the anti-fouling load, means and methods may be used that can generate local DC currents when fed with AC power. The DC current source may be isolated from the steel hull (for example serving as ground terminal). Thus, although electro-chemistry may occur when DC power terminals become exposed, the electro-chemistry will be confined to the area of exposure. Furthermore, the magnitude of the electro-chemistry will depend on the amount of DC current that can flow locally and the surface area of the electrodes exposed. Hence, there is also a need to limit the DC current near to a value as required by the UV-C LEDs (typically 0.1 to 10 mA for small LEDs) and to limit the surface area of the exposed local DC power terminals. Using the capacitor provided by the mirror for transferring AC power to the LEDs avoids the above problems of exposed power terminals.

In practice a substantial area of the anti-fouling solution may become damaged over life. In theory, the damage can comprise local damage of one or more UV-C LEDs within one or more loads or even a large part of a load might disappear. Hence, (seamless) tiled loads are proposed in an embodiment. Within the tile some kind of sub-division of the UV-C LEDs and power source may be provided via respective capacitors, since one failing LED (or, generally, load) should not yield the functional remainder of the tile to become non-operational on damage. Hereby, failing LEDs can yield either an open or a short circuit, and series LED strings may be avoided. A tradeoff is to be made. Series connections are beneficial, because the inherent spread of I-V characteristics is evened out over a series of LEDs; thus making sure that individual strings operate more equally regarding light output. However, a single LED failure in a series connection string will render the entire string inoperable. So additional measures may be taken to cope with single LED failure. In practice, medium length series strings may be used, and/or a pattern of strings may be used so that a single failure is at least partly compensated by other strings.

Obviously, also tiled loads will still require some kind of electrical power, either wired or wireless. Given the expected issues with a wire hassle, and the off-shore industry being rough and tough, wireless power solutions are preferred and proposed by the present invention. Yet, with both the sea water and the iron hull being good electrical conductors, the power transfer losses in inductive systems as well as (RF) wireless solutions can be quite large. Besides that, they can be rather bulky. Hence, an attractive solution to provide electric power makes use of AC capacitive coupling.

Conventional capacitive (wireless) power transfer systems use one or two (long) supply wires driven by an AC oscillator. When the supply wires are covered with a dielectric film, a receiving element having two pick-up electrodes can be placed on top anywhere along the wires and power is transferred. Further, in known electrical power arrangement for powering a load the transferred power may be reactance limited. The system functions because of the well isolating properties of the ambient air. Thus, high voltage electric fields can be set-up between the two passive ground electrodes of the receiving element. However, when the ambient environment becomes conductive, as is the case for sea water, the transfer of power becomes also facilitated anywhere along the two wires by the well conducting ambient. Hence, it is very difficult to transfer any power at all towards the intended receiving element.

According to the present invention the use of a capacitive power transfer has been modified and optimized for application e.g. in electrical power arrangements for transferring power to light sources mounted to the part of a ship hull that is usually under water, i.e. in a wet, conductive and harsh ambient environment.

FIG. 1 shows a light emitting arrangement configured to realize anti-fouling of a protected surface 30 when immersed in a fouling liquid 10 containing biofouling organisms. The light emitting arrangement 100 is shaped in sheet form as indicated by dashed lines, and has a front surface 301 facing the fouling liquid and a back surface 201 facing the protected surface. In such sheet the emission surface of the optical medium and the back surface of the optical medium are substantially planar and extend substantially parallel to each other. The Figure diagrammatically shows a sectional view of a portion of an optical medium that is part of the light emitting arrangement, an LED embedded in the optical medium, and a mirror 40 as present near the back surface of the optical medium, wherein possible paths of light beams are diagrammatically indicated by means of arrows.

The lighting arrangement has an optical medium 4 and a light source 20 embedded in the optical medium for emitting anti-fouling light as shown by the arrows emanating from the light source. The light source 20 is adapted to emit ultraviolet light, for example an UV-C LED as elucidated in the section above. The optical medium allows at least part of the anti-fouling light to distribute through the optical medium, as shows by the arrows emanating from the light source, propagating and reflecting internally in the layer of the optical medium. In the examples one light source is shown and explained. In practice, the lighting arrangement may comprise a single optical medium and a plurality of light sources, and a corresponding, associated plurality of mirrors. Each of the mirrors may be electrically coupled to one or more of the light sources.

The optical medium is formed as a sheet or slab and has an emission surface 301 for emitting the anti-fouling light in a direction away from the protected surface 30 when the light emitting arrangement is arranged in or on the protected surface, and a back surface 201 for facing the protected surface. The light emitting arrangement further has at least one mirror 40 for reflecting anti-fouling light from the light source 20 towards the emission surface 301 of the optical medium. The reflecting top layer of the mirror is indicated by the arrow. The mirror is located near or at the back surface 201.

The mirror is electrically conductive and electrically coupled to the light source at a first side as indicated by lead 2a. For example, the mirror is a thin metallic layer of a reflective, conductive metal. At least part of the mirror may be a scattering layer. The mirror constitutes a first electrode 120 arranged for transfer of electrical power between the light source and a power source 1. The first electrode may be shaped to be galvanically coupled to the power source by connectors at an edge of the sheet (not shown). For example, the first electrode 120 may extend further in the sheet as an electrical conductor integrally formed by a metal layer that also forms the mirror.

In the embodiment as shown in FIG. 1 the first electrode 120 is arranged to form a capacitor 6 in combination with a dielectric layer 4a and an external electrically conductive element 50, for example a metallic part having the surface 30 that is to be protected. The capacitor enables capacitive transfer of electrical power between the first electrode and the external element. The Figure schematically shows an AC power source 1 coupled to the metallic part 50 via lead 1a and to the fouling liquid via a lead 1b to a separate electrode 1d extending in the liquid. In the example the light source 20 is coupled to a dedicated electrode 2d via lead 2c so as to provide a galvanic connection via the liquid. In the example it is assumed that the liquid, e.g. seawater, is conductive. Alternative connections of the second side of the light source to the power source are to be considered alternatively, e.g. a direct wire connection or connection via a further capacitor as discussed below.

In practice the light emitting arrangement may have a pattern of multiple light sources and associated mirrors to cover an extended area while substantially provided homogeneous light emission from the emission surface. In such arrangement the galvanic or direct wire connections may be shared by multiple light sources. Also a further capacitor may be shared by connecting multiple second sides of light sources.

Figure 2:
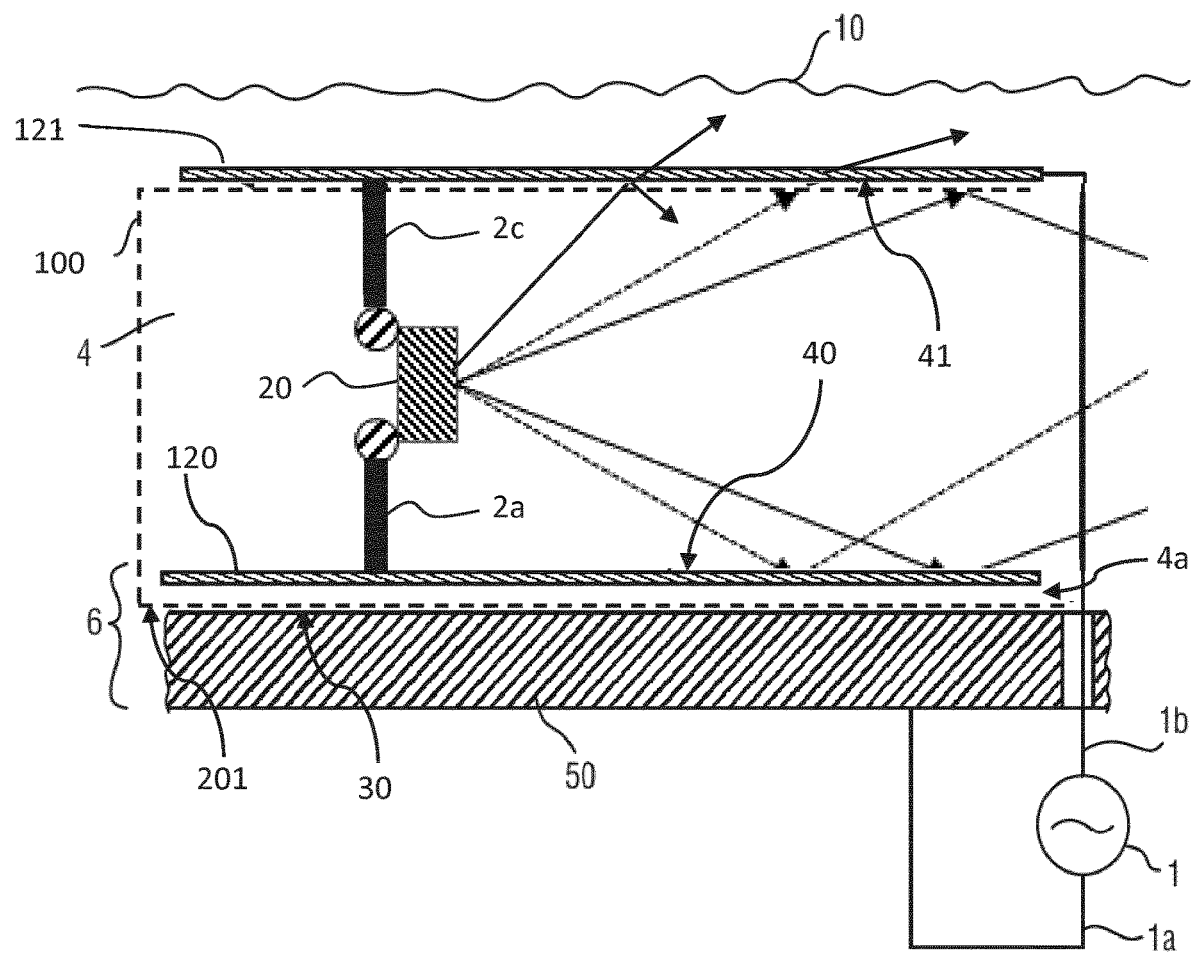
FIG. 2 shows a second example of a light emitting arrangement for realizing anti-fouling of a protected surface.

FIG. 2 shows a second example of a light emitting arrangement configured to realize anti-fouling of a protected surface 30 when immersed in a fouling liquid 10 containing biofouling organisms. The light emitting arrangement 100 is similar to the example shown in FIG. 1; corresponding elements are provided with the same numerals and are described above.

The lighting arrangement now has a second mirror 41 arranged at the emission surface of the sheet. The reflecting top layer of the mirror is indicated by an arrow. The second mirror may be partly transparent for the anti-fouling light as indicated by arrows both reflecting and also passing the mirror 41. Also the second mirror may be patterned, e.g. provided with a pattern of holes, to partly transmit the anti-fouling light. Optionally, the extent to which the further mirror 41 is patterned or semi-transparent to the anti-fouling light increases in a direction away from the light source 20.

The second mirror may be electrically conductive and electrically coupled to a second side of the light source 20 via lead 2c. In the example the second mirror provides a second electrode 121 that provides a galvanic connection to the power source 1 via lead 1b. Optionally, the lead 2c is also thermally conductive, e.g. a metal strip, so as to guide heat from the light source to the second mirror 41 for constituting a heat sink.

Figure 3:
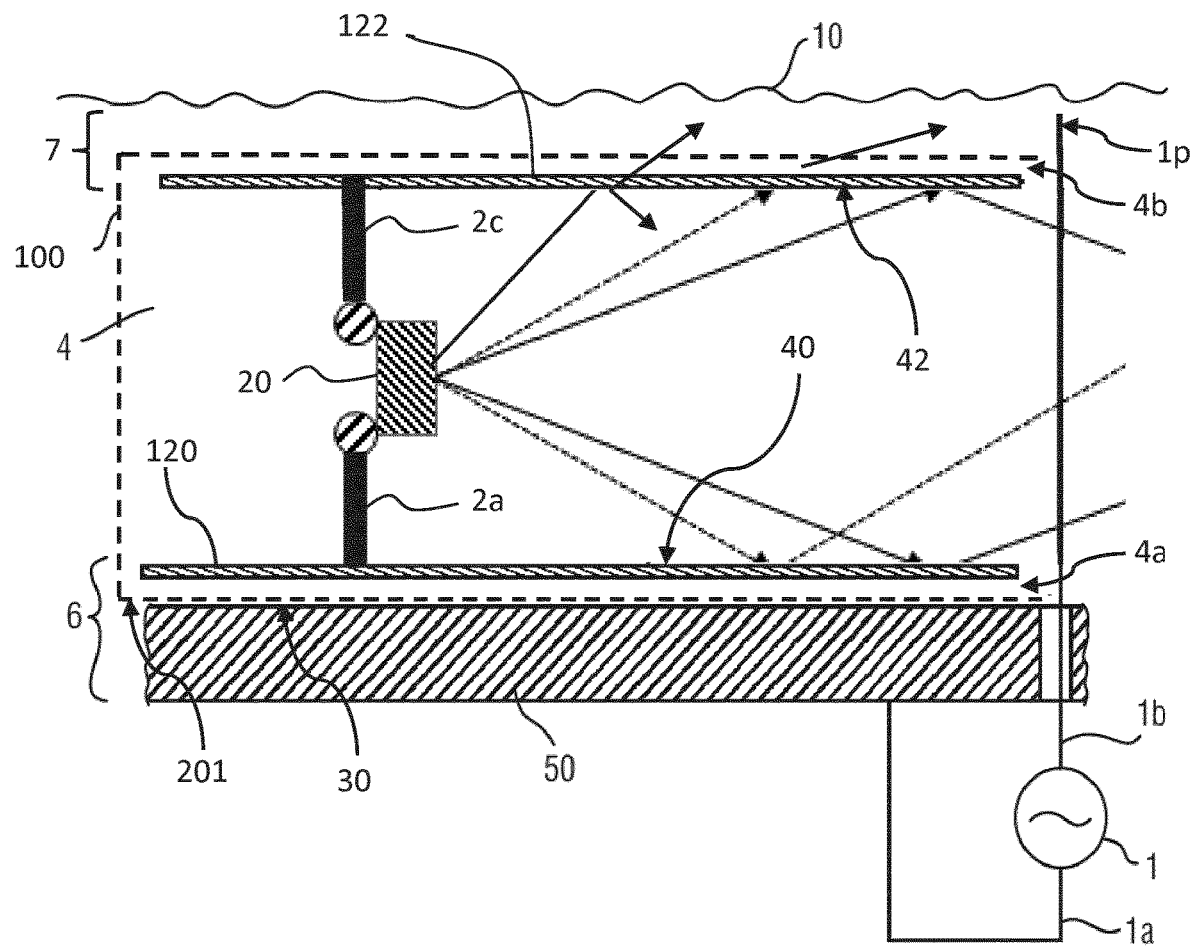
FIG. 3 shows a third example of a light emitting arrangement for realizing anti-fouling of a protected surface.

FIG. 3 shows a third example of a light emitting arrangement configured to realize anti-fouling of a protected surface 30 when immersed in a fouling liquid 10 containing biofouling organisms. The light emitting arrangement 100 is similar to the examples shown in FIGS. 1 and 2; corresponding elements are provided with the same numerals and are described above.

In the embodiment of FIG. 3, a second mirror 42 is embedded in the optical medium, which also may protect the mirror material against deterioration due to contact with the liquid. When embedded, the mirror may be galvanically connected to the light source for constituting a second electrode 122 for transfer of electrical power from the power source 1, for example connected by additional embedded metal tracks or wires (not shown) from the embedded mirror to the power source.

Alternatively, the second mirror 42, when embedded, may constitute a second electrode 122 for transfer of electrical power by forming a further capacitor 7 in combination with a dielectric layer 4b and a further external conductive element. In practice, the liquid 10 may constitute such external conductive element. The power source may then have a power source electrode 1p extending in the liquid. Hence the further mirror may be conductive and electrically coupled to the light source via lead 2c for constituting a further electrode 122 arranged to form, in combination with a further external electrically conductive element a galvanic connection or a further capacitor for transfer of electrical power between the further electrode and the further external electrically conductive element.

Optionally, in the light emitting arrangement, at least one of the mirrors 40, 41, 42 is thermally coupled to the light source for constituting a heat sink for heat from the light source. The heat-conductive material may be positioned between the light source and the mirror so as to conduct heat from the light source to the mirror. In such lighting arrangements the mirror is arranged to provide three different physical properties: optical (being a mirror), electrical (as part of the capacitor), and thermally (as a heat sink).

Optionally, in the light emitting arrangement, the mirror is thermally coupled to the light source via an electrically conductive material, the material also providing said electrical coupling to the light source. In a practical example the lead 2a and/or lead 2c between the light source and the mirror may be designed to also conduct heat, e.g. by using relatively thick wire, a metal strip and/or solder paste. Optionally, a side-emitting type of LED may be selected that allows direct attaching or soldering to the mirror while the light is emitting sideways, i.e. along the surfaces of the sheet instead of transversal to the surface. Furthermore, an LED may be selected that has a further thermal mounting area or contact. Such contact can be arranged on the mirror or an intermediate thermally conductive material between said LED thermal mounting area or contact and the mirror may be applied to guide heat from the LED to the mirror so as to provide a heat sink.

In an embodiment of the above light emitting arrangement, the mirror comprises at least a first part and a second part isolated from the first part; and the first part of the mirror is electrically coupled to the light source for constituting the first electrode and the second electrically part is electrically coupled to the light source for constituting a further electrode. By forming two isolated parts of the mirror, such parts may form separate capacitors when aligned with respective external conductive elements.

For example, in an embodiment of the sheet having a multitude of light sources, the mirrors in a first area of the sheet may be electrically connected to together form the first electrode, while the mirrors in a second area of the sheet may be electrically connected to together form the second electrode. Both areas may form respective capacitors when positioned above corresponding external conductive elements. The two capacitors can be used to transfer the power to both connections of the LED light sources.

In an embodiment of the above light emitting arrangement, the mirror may comprise multiple parts, the parts being arranged to achieve a more even light distribution across the surface. For example, at least a first part of the mirror 40 may be arranged for reflecting anti-fouling light in a specular manner from the light source 20 towards the emission surface of the optical medium 4. Optionally, at least a second part of the mirror 40 is arranged and configured to predominantly make the anti-fouling light scatter out of the optical medium through the emission surface of the optical medium.

Figure 4:
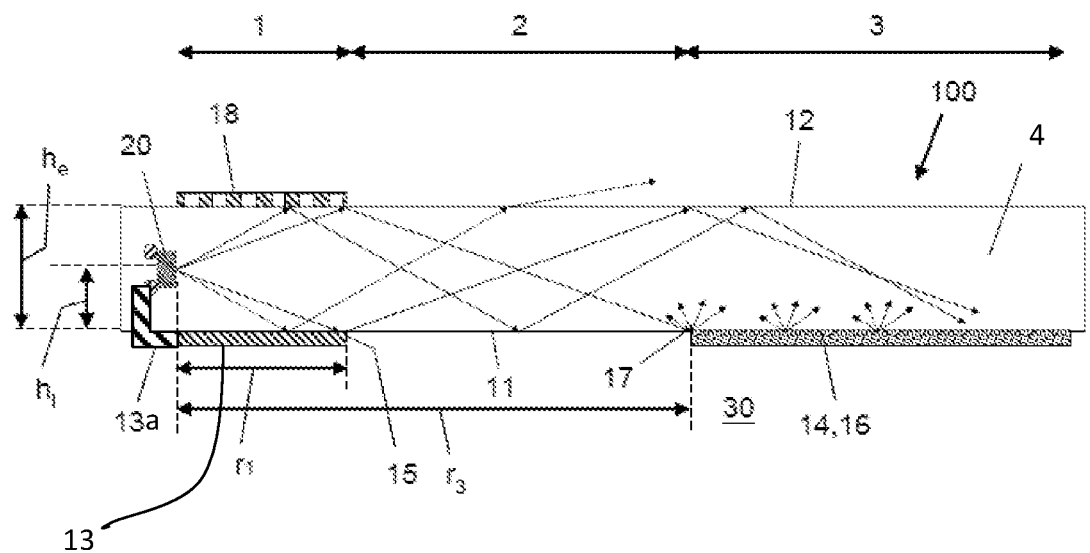
FIG. 4 shows a further embodiment of a light emitting arrangement having mirror zones.

FIG. 4 shows a further embodiment of a light emitting arrangement 100. The light emitting arrangement 100 comprises an optical medium in the form of a slab 10 of ultraviolet transparent silicone, and furthermore comprises one or more light sources in the form of side-emitting ultraviolet LEDs 20 embedded in the slab 10. Multiple light sources may be arranged in a series of parallel connections in a grid, particularly a grid having a chicken-wire structure. That does not alter the fact that other series and/or parallel arrangements of the light sources 20 are feasible within the framework of the invention.

The slab 10 has a back surface 11 for facing a protected surface 30, i.e. a surface that needs to be kept clean from biofouling in an environment in which the surface is exposed to a fouling liquid, at least during a part of the lifetime thereof, and an emission surface 12 for emitting the ultraviolet light emitted by the LEDs 20 in a direction away from the protected surface 30. Besides a function in accommodating the LEDs 20, the slab 10 has a function in distributing at least part of the ultraviolet light of each of the LEDs 20 across a portion of the protected surface 30 before being emitted in the direction away from the protected surface 30.

FIG. 4 provides a clear illustration of the fact that portions of the back surface 11 of the slab 4 are covered. In particular, a pattern of mirrors 13 for reflecting the ultraviolet light and scattering mirror 14 for scattering the ultraviolet light is present so as to cover portions of the back surface 11 of the slab 10. The mirror 13 is provided with an extended portion 13a that connects the mirror electrically to a first side of the light source 20. The expanded portion may also be formed by a separate material, e.g. a soldering material, that physically and electrically connects the LED to the mirror.

The mirrors 13 may have a substantially circularly curved outer boundary 15, and each of the mirrors 13 may be associated with one of the LEDs 20. The LEDs 20 are in the center of the substantially circularly curved shape of the outer boundary 15 of the mirrors 13. For the sake of completeness, it is noted that the reflective side of the mirrors 13 faces the back surface 11 of the slab 10. The scattering mirror 14 may comprise a series of interconnected scattering layer portions 16 having a substantially circularly curved inner boundary 17, the inner boundary 17 of each of the scattering layer portions 16 having a concentric positioning with respect to the outer boundary 15 of one of the mirrors 13.

As shown the mirrors 13, 14 are at provided the back surface. For forming a capacitor, the surface to be protected or the back surface of the lighting arrangement may be provided with an additional layer for constituting an isolating, dielectric layer, e.g. a paint or coating. Alternatively, the mirrors 13, 14 may be embedded in the material slab 4, which then constitutes a dielectric layer. Subsequently, when attached to a conductive surface to be protected, the combination of the mirror, dielectric layer and the external conductive surface form the capacitor that enables transfer of AC power to the LED.

In the example embodiment, in combinations of 1) an LED 20, 2) a mirror 13 associated with the LED 20, wherein the LED 20 has a substantially central position with respect to the outer boundary 15 of that mirror 13, and 3) a scattering layer portion 16 of which the inner boundary 17 has a substantially concentric positioning with respect to the outer boundary of that mirror 13, the inner boundary 17 of the scattering layer portion 16 extends at a distance from the outer boundary 15 of that mirror 13. On the basis thereof, groups of three zones 1, 2, 3 covered by the ultraviolet anti-fouling light from an LED 20 can be distinguished in the light emitting arrangement 100, namely a first zone 1 at the position of the mirror 13 associated with the LED 20, a third zone 3 at the position of the scattering layer portion 16 associated with both the LED 20 and that mirror 13, and a second zone 2 as present between the first zone 1 and the third zone 3.

The application of the mirrors 13 and the scattering mirrors 14 is aimed at improving the distribution of the ultraviolet light emitted by the LEDs 20 across the emission surface 12 of the slab, thereby achieving a more effective use of the ultraviolet light, which involves a reduction of power consumption of the light emitting arrangement 100, for example, and/or enables one LED 20 to cover a larger portion of the emission surface 12, so that the number of LEDs 20 can be kept to a minimum.

It follows from the foregoing that a group of three zones 1, 2, 3 is associated with each of the LEDs 20. One LED 20 and an associated group of zones 1, 2, 3 is diagrammatically shown, possible paths of light beams being diagrammatically indicated by means of arrows. The first zone 1 is closest to the LED 20. In view thereof, this zone 1 is designed so as to ensure that most of the light is propagated in the direction of the second zone 2 and the third zone 3. Only light beams hitting the emission surface 12 of the slab in the first zone 1 at a relatively small angle to the normal of the emission surface 12 are allowed to (partially) escape from the slab. As is well-known in the field of optics, a critical value of the angle as mentioned is determined by the indices of refraction of the two materials as present at a boundary surface, which are the material of the slab 10 and the medium outside of the slab 10 in the case of the light emitting arrangement 100, wherein it is to be noted that the medium outside of the slab is expected to be a fouling liquid. The other light beams hitting the emission surface 12 of the slab in the first zone 1 are propagated in the direction of the second zone 2 and the third zone 3. In particular, those other light beams are not allowed to escape from the slab, but are reflected on the emission surface 12 instead, so that they are deflected in the direction of the back surface 11 of the slab, and exit the first zone 1 as they propagate. Furthermore, all light beams hitting the back surface 11 in the first zone 1 are not allowed to escape from the slab, but are reflected on the back surface 11 and/or the mirror 13 instead, which causes a substantial amount of the light to propagate in the direction of the second zone 2 and the third zone 3.

The light beams reaching the second zone 2 and hitting one of the back surface 11 and the emission surface 12 of the slab 10 are only allowed to escape from the slab in the second zone 2 in case the angle of incidence of the light on the surface 11, 12 is smaller with respect to a normal of the surface 11, 12 than the critical angle. The configuration of the slab accommodating the LED 20 is chosen so as to predominantly rely on total internal reflection in the second zone 2, so that only a relatively small amount of the light received from the first zone 1 is allowed to escape from the slab at the emission surface 12 of the slab, whereas a relatively large amount of the light is made to propagate in the direction of the third zone 3. In order to enhance the light reflecting functionality in the second zone 2, a low-index layer (not shown) such as a sol-gel coating, especially a layer having a lower index of refraction than the fouling liquid, may be applied to the back surface 11 of the slab in the second zone 2. It is also possible to have a suitable mirror (not shown) for covering at least a portion of the back surface 11 of the slab in the second zone 2, a reflective side of the mirror facing the back surface 11.

The third zone 3 is the most remote from the LED 20. In view thereof, the scattering layer portion 16 is applied in the third zone 3, so that it is ensured that practically all of the light beams reaching the third zone 3 are directed towards the emission surface 12 of the slab, in such a way as to be oriented at a relatively small angle with respect to the normal of the emission surface 12. Hence, the third zone 3 is configured so as to direct practically all of the light remaining after having passed the first zone 1 and the second zone 2 out of the slab.

Optionally, the first zone may have a substantially circularly curved outer boundary and the third zone may have a substantially circularly curved inner boundary, the light source being at the center of the circular shapes, so that the boundaries are at a constant distance from the light source as seen along the directions in which the anti-fouling light may travel from the light source. In order to achieve that in the first zone at least a major part of the light is reflected in a specular manner towards the emission surface of the optical medium, that in the second zone at least a major part of the light is propagated through the optical medium by total internal reflection, and that in the third zone at least a major part of the light is scattered out of the optical medium, through the emission surface of the optical medium. A radial distance between the outer boundary of the first zone and the light source relates to positional aspects of the light source in the optical medium and a critical angle for total internal reflection in the optical medium and/or a radial distance between the inner boundary of the third zone and the light source relates to dimensional aspects in the optical medium, positional aspects of the light source in the optical medium and a critical angle for total internal reflection in the optical medium. In particular, a radial distance between the substantially circularly curved outer boundary of the first zone and the light source may be chosen so as to be equal to or larger than $h_1/\tan(90°-\theta)$, and/or a radial distance between the substantially circularly curved inner boundary of the third zone and the light source may be chosen so as to be equal to or larger than $(h_e+(h_e-h_1))/\tan(90°-\theta)$, in which $h_1$ represents a height level of the light source with respect to the back surface of the optical medium, in which $h_e$ represents a height level of the emission surface of the optical medium with respect to the back surface of the optical medium, and in which $\theta$ represents a critical angle for total internal reflection in the optical medium, which is defined as arc $\sin(n_2/n_1)$, in which $n_1$ represents an index of refraction of the material of the optical medium, and in which $n_2$ represents an index of refraction of the fouling liquid in which the protected surface is to be immersed. In that way, it can be achieved that the design of the light emitting arrangement is optimized by taking the behavior of the anti-fouling light in the environment constituted by the optical medium and the adjacent fouling liquid into account, particularly the behavior as based on a range of angles of impact on the emission surface in which the light is capable of escaping from the optical medium and a range of angles of impact on the emission surface associated with total internal reflection of the light in the optical medium.

In the following, an example of possible values of dimensions and other parameters relating to the light emitting arrangement 100 is given. The LEDs 20 are assumed to be LEDs which are configured to emit ultraviolet light of the c type (UVC), and the slab 4 is assumed to be a transparent light guide slab having a thickness, i.e. a height $h_e$ of the emission surface 12 of the slab 10 with respect to the back surface 11 of the slab, of 10 mm. Furthermore, the LEDs 20 are assumed to be mounted to emit light in a sideway direction, at a height $h_1$ of 5 mm with respect to the back surface 11 of the slab. The index of refraction at a UVC wavelength of 275 nm of seawater and silicone are 1.38 and 1.46, respectively, resulting in a critical angle $\theta$ for total internal reflection equal to $\theta$=arc sin (1.38/1.46)=70.9°. In order to have a very good light distribution effect across the emission surface 12 of the slab 10, it is advantageous for a radius $r_1$ of the outer boundary 15 of the first zone 1 to be equal to or larger than $r_1=h_1/\tan(90°-\theta)=14.5$ mm. Furthermore, it is advantageous for a radius r3 of the inner boundary 17 of the third zone 3 to be equal to or larger than $r_3=(h_e+(h_e-h_1))/\tan(90°-\theta)=43.5$ mm. It is noted that $h_e$, $h_1$, $r_1$ and $r_3$ are indicated in FIG. 4.

The extent to which the light emitting arrangement 100 may be effective in realizing distribution of light across the emission surface 12 of the slab may be even further enlarged by increasing $h_1$. For example, it may be practical to position the LEDs 20 at a height $h_1$ of 8 mm with respect to the back surface 11 of the slab. Furthermore, it may be beneficial to have a tilted orientation of the LEDs, particularly an orientation in which the LEDs are arranged to emit light in a more downward direction, particularly to emit more than 50% of the light directly towards the back surface 11 of the slab in the first zone 1.

FIG. 4 particularly illustrates a possibility of applying an additional mirror 18 in the first zone 1, namely a mirror 18 for at least partially covering the emission surface 12 of the slab 4 in the first zone 1, a reflective side of the mirror 18 facing the emission surface 12. It is practical for such an additional mirror 18 to be semi-transparent to the light emitted by the LED 20. In view thereof, the mirror 18 may be a patterned mirror as schematically indicated in FIG. 4. By having the additional mirror 18, it is possible to ensure that even more light is made to propagate from the first zone 1 towards the second zone 2 and the third zone 3 and to have a distribution of the light across the emission surface 12 of the slab 10 which is optimized even further. In that respect, it is an advantageous possibility for the additional mirror 18 to be designed in such a way that the semi-transparency thereof increases in a direction from the LED 20 to the outer boundary 15 of the first zone 1.

In an embodiment (not shown) the additional mirror 18 is connected to the light source so as to form a second electrode. The second electrode may directly, galvanically contact the power source, e.g. via further conductive tracks connecting the additional mirrors to the power source. Alternatively, the additional mirror 18 may constitute an electrode in contact with the fouling fluid, similar to the second mirror in the embodiment shown and described with FIG. 2.

In a further embodiment (not shown), for forming a further capacitor, the emission surface of the lighting arrangement may be provided with an additional layer for constituting an isolating, dielectric layer, e.g. a paint or coating. Alternatively, the mirror 18 may be embedded in the material slab 4 near the emission surface, like the second mirror in FIG. 3. The material then forms, when immersed in liquid, a thin layer between the mirror and the liquid, which so constitutes a further dielectric layer. Subsequently, when immersed in the fouling fluid, the combination of the mirror, dielectric layer and the external conductive liquid form a second capacitor that enables transfer of AC power to the LED.

Figure 5:
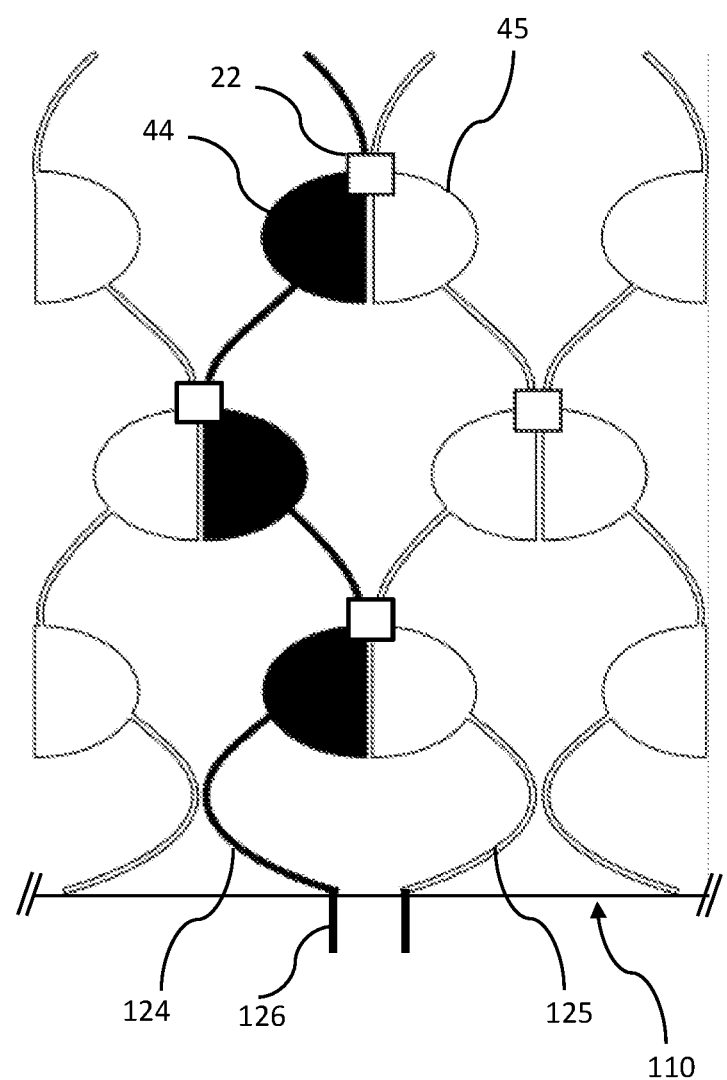
FIG. 5 shows a further example of a light emitting arrangement configured to realize anti-fouling of a protected surface.

FIG. 5 shows a further example of a light emitting arrangement configured to realize anti-fouling of a protected surface. The light emitting arrangement 110 is shown as part of a sheet in top view from its emission surface side, one edge of the sheet being indicated by the arrow.

The light emitting arrangement 110 is shaped in sheet form by an optical medium and light sources 22 embedded in the optical medium for emitting anti-fouling light from its emission surface as discussed above. The plurality of light sources 22 has a corresponding, associated plurality of mirrors 44, 45. In the example each light source is located, with its light emanating side, near an edge of a respective mirror. The mirror is electrically divided in a first mirror part 44 shown in black and a second mirror part 45 shown in white. Both mirror parts together constitute the mirror to optically distribute the anti-fouling light towards the emission surface. Also, the first mirror part is electrically connected to a first electrical terminal of the respective light source and the second mirror part is connected to a second electrical terminal of the respective light source. The first mirror part so forms a first electrode to be connected to a first terminal of a power source, while the second mirror part forms a second electrode to be connected to a second terminal of a power source for transfer of electrical power to the light sources.

In the embodiment, the first mirror part 44 is electrically connected to further first mirror parts by a metal conductor, e.g. integrally formed tracks in a patterned metal layer. A number of connected first mirror parts 44 constitutes a first electrode 124. Similarly, a number of connected second mirror parts 45 constitutes a second electrode 125. The first and second electrodes may be coupled to a power source by connectors 126 at the edge of the sheet for transfer of electrical power from the power source to the light sources. Each of the mirror parts may be electrically coupled to one or more of the light sources by further tracks or mirror parts to constitute further electrical circuitry for connecting subsets of the light sources connected in series and/or parallel.

It will be clear to a person skilled in the art that the scope of the invention is not limited to the examples discussed in the foregoing, but that several amendments and modifications thereof are possible. While the invention has been illustrated and described in detail in the figures and the description, such illustration and description are to be considered illustrative or exemplary only, and not restrictive. The invention is not limited to the disclosed embodiments. The drawings are schematic, wherein details that are not required for understanding the invention may have been omitted, and not necessarily to scale.

Variations to the disclosed embodiments can be understood and effected by a person skilled in the art in practicing the claimed invention, from a study of the figures, the description and the attached claims. In the claims, the word "comprising" does not exclude other steps or elements, and the indefinite article "a" or "an" does not exclude a plurality. The term "comprise" as used in this text will be understood by a person skilled in the art as covering the term "consist of". Hence, the term "comprise" may in respect of an embodiment mean "consist of", but may in another embodiment mean "contain/include at least the defined species and optionally one or more other species". Any reference signs in the claims should not be construed as limiting the scope of the invention.

Elements and aspects discussed for or in relation with a particular embodiment may be suitably combined with elements and aspects of other embodiments, unless explicitly stated otherwise. Thus, the mere fact that certain measures are recited in mutually different dependent claims does not indicate that a combination of these measures cannot be used to advantage.

In a general sense, it is a basic function of the light emitting arrangement 100 according to the invention to keep a protected surface 30 free from biofouling. Hence, the invention is applicable in all situations involving a fouling risk, which are situations in which the protected surface is intended to be immersed, at least during a part of the lifetime thereof, in a fouling liquid containing biofouling organisms. Seawater is a well-known example of such a fouling liquid.

So a marine structure may have an outer surface comprising the above described light emitting arrangement. The light emitting arrangement is then attached to said outer surface for realizing anti-fouling of the outer surface when immersed in a fouling liquid containing biofouling organisms. Similarly, a method for installing the above light emitting arrangement includes the step of attaching the light emitting arrangement to an outer surface of a marine structure for realizing anti-fouling of the outer surface when immersed in a fouling liquid containing biofouling organisms.

Finally, use of the above light emitting arrangement is foreseen, in particular use of the light emitting arrangement installed to an outer surface of a marine structure for realizing anti-fouling of the outer surface when immersed in a fouling liquid containing biofouling organisms. The use requires the lighting arrangement to be powered by an AC power source having a sufficiently high frequency to pass the required power to the light source via the capacitor. So, the light emitting arrangement 100 according to the invention may be applied on a vessel's hull. Other examples of the protected surface 30 include the exterior surface of box coolers, surfaces of subsea off-shore equipment, interior walls of water reservoirs like ballast tanks of vessels, and filter surfaces of filter systems in desalination plants.

The optical medium 4 that is part of the light emitting arrangement 100 according to the invention may come in any suitable form, depending on the intended application of the light emitting arrangement 100. It may be practical for the optical medium 4 to comprise a slab of material as mentioned earlier, wherein the material may be any type of material which is suitable for allowing anti-fouling light to propagate through the optical medium 4. Furthermore, the material may be flexible, for example, so as to allow the slab to be bent in case such is necessary for following the outline of a protected surface 30.

Summarizing, a light emitting arrangement is provided for realizing anti-fouling of a surface. The light emitting arrangement is shaped in sheet form and has an optical medium and a light source embedded in the optical medium and configured to emit anti-fouling light from an emission surface. The light emitting arrangement has at least one mirror configured to reflect anti-fouling light from the light source towards the emission surface. The mirror is arranged near or at the back surface and is conductive and electrically coupled to the light source for constituting a first electrode arranged for transfer of electrical power between the light source and a power source. For example, the mirror forms a capacitor in combination with an external electrically conductive element and a dielectric layer. The capacitor enables capacitive transfer of electrical power between the first electrode and the external element.

The invention claimed is:

1. A light emitting arrangement configured to realize anti-fouling of a protected surface of a marine structure when immersed in a fouling liquid containing biofouling organisms, the light emitting arrangement including a sheet, and comprising:
   an optical medium and a light source embedded in the optical medium and configured to emit anti-fouling light, the optical medium allowing at least part of the anti-fouling light to distribute through the optical medium,
   the optical medium having a back surface to be arranged in or on the protected surface and an emission surface configured to emit the anti-fouling light in a direction away from the protected surface, and
   the light emitting arrangement further comprising at least one mirror configured to reflect anti-fouling light from the light source towards the emission surface of the optical medium,
   wherein the mirror is arranged near or at the back surface and is electrically conductive and electrically coupled to the light source for providing a first electrode arranged for transferring electrical power between a power source and the light source, and
   wherein the mirror is thermally conductive and thermally coupled to the light source for constituting a heat sink for heat from the light source.

2. The light emitting arrangement of claim 1, wherein the mirror is arranged to provide the first electrode arranged to form, in combination with an external electrically conductive element and a dielectric layer, a capacitor for capacitive transfer of electrical power between the first electrode and the external electrically conductive element.

3. The light emitting arrangement of claim 1, wherein the mirror is thermally coupled to the light source via an electrically conductive material, the material also providing said electrical coupling to the light source.

4. The light emitting arrangement claim 1, wherein the mirror comprises at least a first part and a second part electrically isolated from the first part; and wherein the first part of the mirror is electrically coupled to the light source for providing the first electrode and the second part is electrically coupled to the light source for providing a further electrode.

5. The light emitting arrangement of claim 1, wherein at least a first part of the mirror is arranged for reflecting anti-fouling light in a specular manner from the light source towards the emission surface of the optical medium.

6. The light emitting arrangement of claim 1, wherein at least a second part of the mirror is arranged and configured to predominantly make the anti-fouling light scatter out of the optical medium through the emission surface of the optical medium.

7. The light emitting arrangement of claim 6, wherein the light emitting arrangement comprises a group of three zones covered by anti-fouling light from the light source, including a first zone comprising the first part of the mirror which is arranged and configured to predominantly make the anti-fouling light reflect in a specular manner towards the emission surface of the optical medium, a second zone which is arranged and configured to predominantly realize propagation of the anti-fouling light through the optical medium by total internal reflection, and a third zone comprising the second part of the mirror which is arranged and configured to predominantly make the anti-fouling light scatter out of the optical medium through the emission surface of the optical medium, the first zone being closer to the light source than the second zone, and the second zone being closer to the light source than the third zone.

8. The light emitting arrangement of claim 1, comprising a further mirror near or at the emission surface, wherein at least a portion of the further mirror is patterned or semi-transparent to the anti-fouling light, and wherein an extent to which the further mirror is patterned or semi-transparent to the anti-fouling light increases in a direction away from the light source.

9. The light emitting arrangement of claim 8, wherein the further mirror is electrically conductive and electrically coupled to the light source for constituting a further electrode arranged to form, in combination with a further external electrically conductive element a galvanic connection or a further capacitor for transfer of electrical power between the further electrode and the further external electrically conductive element.

10. The light emitting arrangement of claim 1, wherein the mirror comprises a first mirror part and a second mirror part, the first mirror part being electrically connected to a first electrical terminal of the light source and forming the first electrode and the second mirror part being electrically connected to a second electrical terminal of the light source and forming a second electrode to be connected to the power source.

11. The light emitting arrangement of claim 1, comprising a single optical medium and a plurality of light sources and an associated plurality of mirrors, and wherein each of the mirrors is electrically coupled to one or more of the light sources.

12. A marine structure having an outer surface, comprising the light emitting arrangement of claim 1, wherein the light emitting arrangement is attached to said outer surface for realizing anti-fouling of the outer surface when immersed in a fouling liquid containing biofouling organisms, and wherein a power source is coupled to the first electrode formed by the mirror for powering the light emitting arrangement.

13. The light emitting arrangement of claim 1, further comprising an external second electrode, wherein the external second electrode is external to the optical medium and is configured to be disposed in the fouling liquid and to be galvanically connected to the light source to further transfer the electrical power between the power source and the light source via the fouling liquid.

14. The light emitting arrangement of claim 13, further comprising a second mirror, wherein the second mirror is electrically connected to a terminal of the light source.

15. The light emitting arrangement of claim 14, wherein the second mirror is disposed inside the optical medium and is galvanically connected to the external second electrode to further transfer the electrical power between the power source and the light source via the fouling liquid.

16. The light emitting arrangement of claim 1, further comprising a second mirror which is disposed external to the optical medium and is electrically connected to the power source, wherein the second mirror is electrically connected to a terminal of the light source to further transfer the electrical power between the power source and the light source.

17. The light emitting arrangement of claim 16, wherein the second mirror is thermally conductive and thermally coupled to the light source for constituting a second heat sink for heat from the light source.

18. A method for installing the light emitting arrangement of claim 1, the method comprising:
attaching the light emitting arrangement of claim 1 to an outer surface of a marine structure for realizing anti-fouling of the outer surface when immersed in a fouling liquid containing biofouling organisms; and
providing a power source coupled to the first electrode formed by the mirror for powering the light emitting arrangement.

19. The method of claim 18, further comprising dissipating heat from the light source via the mirror.

20. A method comprising:
installing the light emitting arrangement of claim 1 to an outer surface of a marine structure;
powering the light emitting arrangement via a power source coupled to the first electrode formed by the mirror; and
the light emitting arrangement anti-fouling the outer surface when the outer surface is immersed in a fouling liquid containing biofouling organisms.

* * * * *